US005608386A

United States Patent [19]
Murphy, III et al.

[11] Patent Number: 5,608,386
[45] Date of Patent: Mar. 4, 1997

[54] ADJUSTABLE HALL EFFECT SWITCH GAUGE

[75] Inventors: Frank W. Murphy, III, Tulsa, Okla.; Vincent H. Rose, Walnut Creek, Calif.; Timothy D. Brumley; James R. Francisco, both of Tulsa, Okla.

[73] Assignee: Murphy Management, Inc., Tulsa, Okla.

[21] Appl. No.: 407,501

[22] Filed: Mar. 21, 1995

[51] Int. Cl.⁶ .................................................. G08B 21/00
[52] U.S. Cl. ........................ 340/688; 200/56 R; 307/116; 335/205
[58] Field of Search ............................ 340/688; 335/205; 200/56 R; 307/116

[56] References Cited

U.S. PATENT DOCUMENTS

| | | | |
|---|---|---|---|
| 3,114,903 | 12/1963 | Murphy et al. | 340/688 |
| 3,274,491 | 9/1966 | Mulligan et al. | 200/56 R |
| 3,578,931 | 5/1971 | Murphy et al. | 200/56 R |
| 3,586,799 | 4/1969 | Murphy, Jr. | 200/56 R |
| 3,683,135 | 8/1972 | Oliver | 200/56 R |
| 4,021,627 | 5/1977 | Francisco | 200/56 R |
| 4,691,185 | 9/1987 | Loubier et al. | 338/32 H |
| 4,745,811 | 5/1988 | Gray | 73/708 |
| 4,768,461 | 9/1988 | Kneitzsch et al. | 116/328 |
| 4,975,687 | 12/1990 | Murphy, Jr. et al. | 340/688 |
| 5,080,035 | 1/1992 | MacManus | 116/328 |
| 5,121,109 | 6/1992 | Murphy, Jr. et al. | 340/688 |

*Primary Examiner*—Glen Swann
*Attorney, Agent, or Firm*—Head, Johnson & Kachigian

[57] ABSTRACT

A lighted switch set gauge includes Hall effect devices using a circuit activating switch attached to a lower extension of indicating and switch set pointers. The switch set pointer is externally adjustable. An overriding slip gear with automatic spring-back is incorporated in the switch set arm prevent damage to the set pointer at the extreme ends of its range of movement. The indicating pointer can be calibrated without removing a hub attached to the shaft of the gauge meter movement.

21 Claims, 8 Drawing Sheets

ADJUSTABLE HALL EFFECT SWITCH GAUGE

BACKGROUND OF THE INVENTION

This invention relates to a magnetically actuated switch gauge and associated circuitry, for controlling other circuits, i.e., act as a circuit breaker to stop or start devices in response to a sensed condition such as temperature, pressure, liquid levels, speed (rpm, mph, etc.) or electrical properties. Typically such condition responsive switch gauges will act to shut down or start equipment, engines or motors, or provide audible or visual signals when a predetermined condition has been reached.

Typical prior signalling and switch gauges can be found in U.S. Pat. Nos. 3,586,799; 4,021,627; and 3,578,931. The concept of magnetically actuated and/or "Hall effect" type switch gauges can be found in U.S. Pat. Nos. 4,957,687 and 5,121,109. Various gauges of this type have been sold under the mark SWICHGAGE® by Frank W. Murphy Mfr., Inc.

SUMMARY OF THE INVENTION

It is an object of this invention to provide an improved switch gage which utilizes the Hall effect signalling means to control a device or devices based upon a preset sensed condition.

It is a further object of the invention to provide a switch gage utilizing the Hall effect in which a moveable switch set pointer is adjustable by a means outside and, in a preferred embodiment, rearwardly, at least behind the face or dial plate, of the gauge housing wherein the gauge setting is normally incapable of change or overriding without removing the gauge from as, for example, a dashboard or other panel.

Another object of the invention is to provide a gauge having gear driven switch set pointer that includes a slip gear tooth and spring-back arrangement to prevent otherwise damaging overriding movement of the set pointer at its extreme ends of the range of movement allowed.

The switch gage of this invention is made up of a gauge movement which is arranged and connected to respond to a particular sensed condition. The sensed condition typically may be pressure, temperature, fluid level or an electrical characteristic. Examples of various movements which maybe utilized within the gauge are air core, diaphragm Bourdon tube-type movements or D'Arsonval-type movements. The movement is connected to a reading pointer which typically passes over a gauge face plate to provide a visual reading of the sensed condition relative to graduations or indicia provided on the face plate or dial plate that corresponds to the condition being sensed. The dial plate includes an arcuate window relative to the indicia wherein a light refractive and reflection means positioned behind the dial plate provides back lighting to the window. A light reflective means is positioned on the light refractive means opposite the window and behind a moveable switch set pointer that reduces parallax reading error. An opening is provided in the dial plate below the window through which light emitted from, as for example, a light emitting diode (LED) which not only provides refractive light to an indicating pointer but also refracts said light to provide the aforesaid back lighting to the window.

A non-captivating, magnetically actuated switch set pointer is arranged to interact with an arcuate magnet on the indicating pointer. The set pointer is positioned behind the dial plate and viewable only through the aforesaid window. A Hall effect chip or transistor is mounted on the set pointer. Both the indicating, or reading, pointer and the switch set pointer have their respective magnet and transistor chip placed opposite their respective pointers. Placement of the magnet provides a counterbalancing effect to the indicating pointer. The set pointer is rotated by an adjustment shaft and spur gear that cooperates with an arcuate rack or larger radius gear formed as a part of the set pointer. Preferably, the adjustment shaft is exposed at the rear of a sealed housing or at least in an inaccessible location to prevent all but authorized adjustment of the set pointer. The location of the set pointer provides a predetermined position, or sensed threshold position, relative to a desired parameter or condition which upon movement of the indicating pointer of the meter or Bourdon tube to that condition will actuate the switching or circuit break control. This occurs when the magnetic flux from the magnet attached to the indicating pointer becomes adjacent the magnetically actuated switch element (Hall effect type) on the set pointer to act, through circuitry, also sealed within the gauge housing, to control the device or devices.

Examples of non-captivating, magnetically actuated switch element and associate circuitry are the Hall effect switching devices described in U.S. Pat. Nos. 4,975,687, and 5,121,109 which are incorporated herein by reference, this invention being an improvement thereof.

The term "non-captivating" is intended to preclude elements where the magnetic interaction between a switch element and the actuating magnet results in a force tending either to retard or induce relative motion between the switching element and the actuating magnet path.

DETAILED DESCRIPTION OF THE PREFERRED EMBODIMENT

Figure 1:
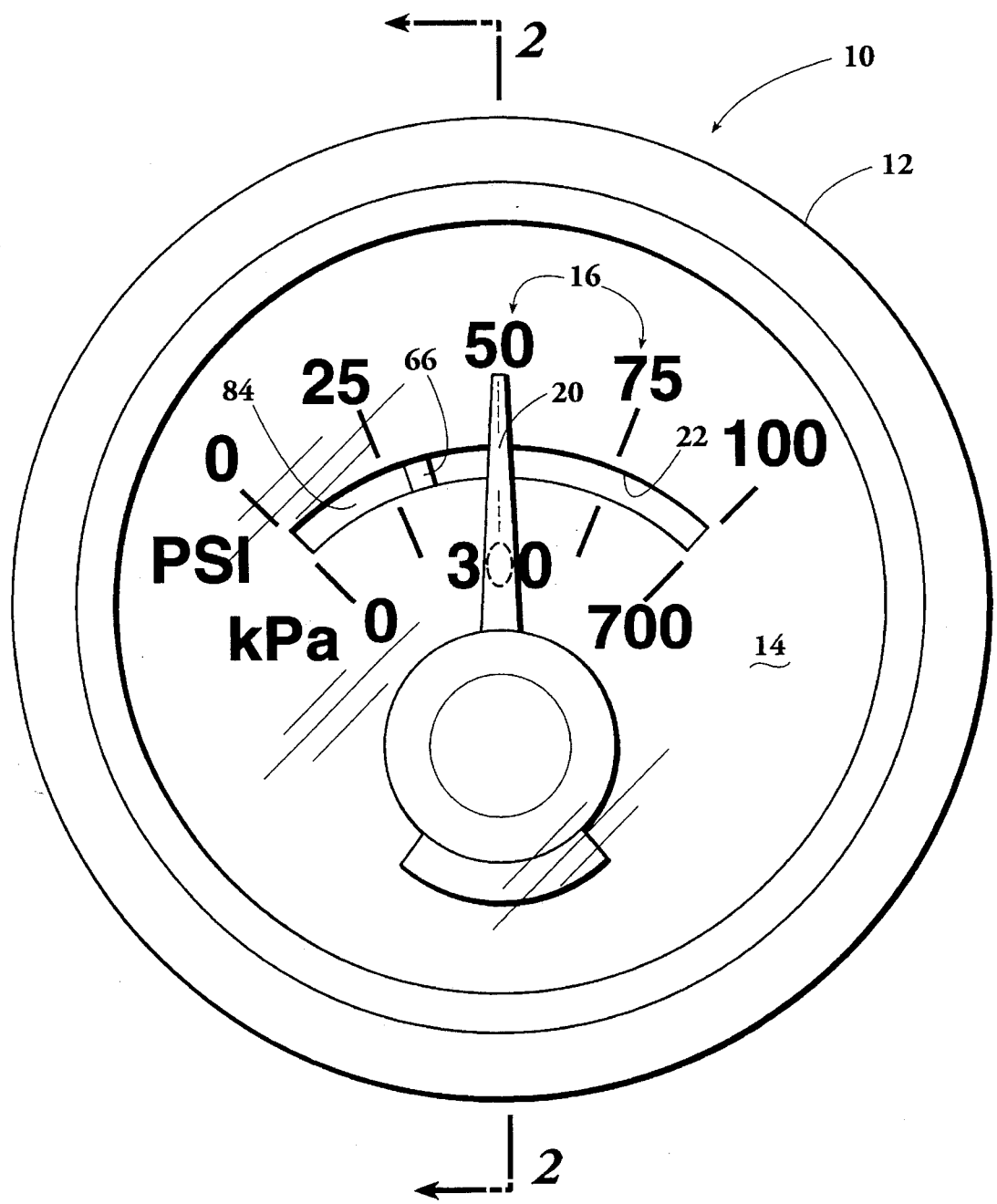
FIG. 1 is a front plan view of the gauge of this invention.
Figure 2:
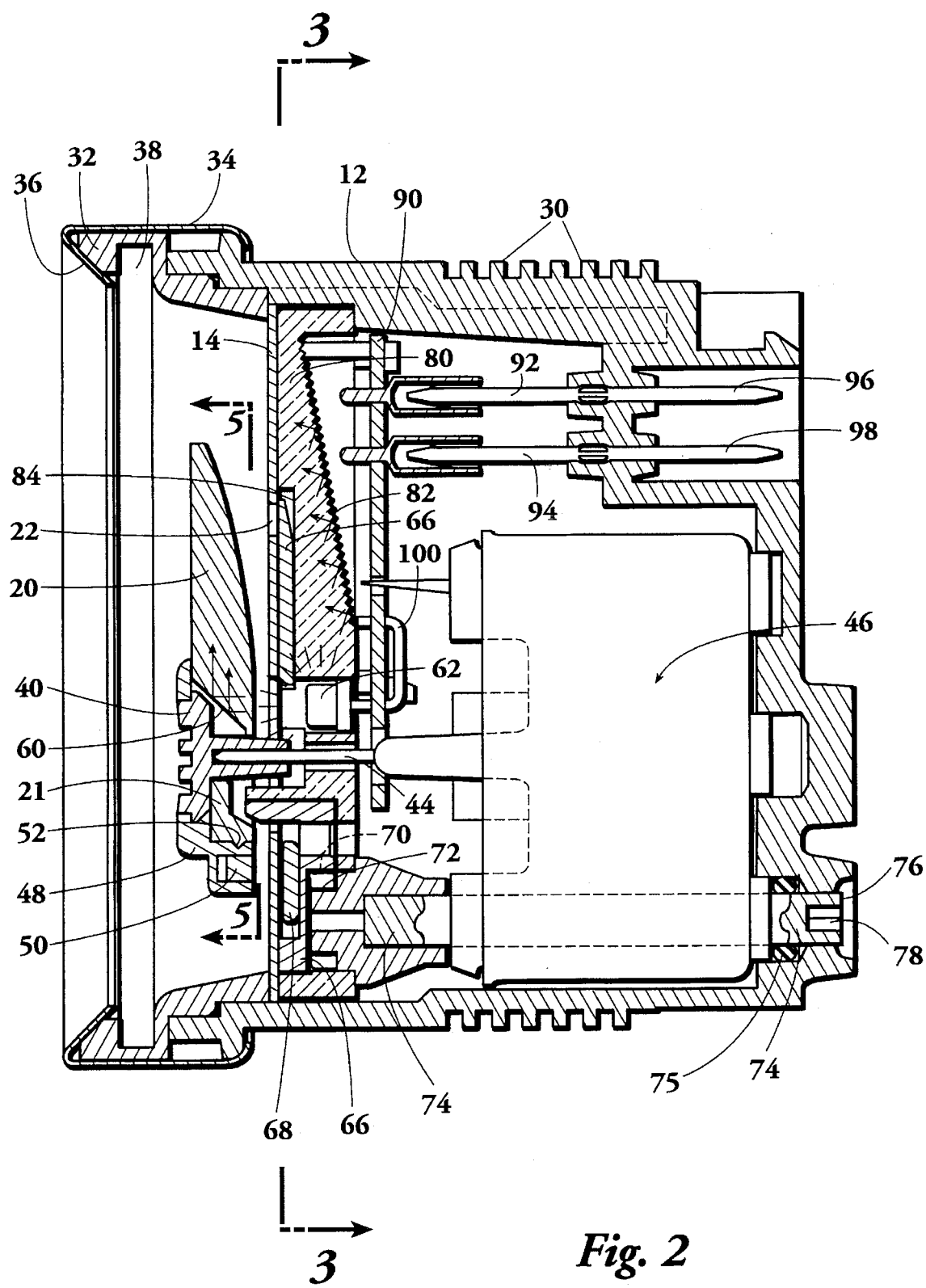
FIG. 2 is a sectional view taken along the line 2—2 of FIG. 1.

Referring now to FIG. 1, the switch gauge of this invention is generally designated by the numeral 10 which includes a housing 12, typically sealed, a dial or face plate 14 having suitable graduation indicia generally designated by the numeral 16 to indicate the particular parameter that is designed to be measured and controlled, i.e., pressure, temperature, etc. An indicating pointer 20 is provided to be actuated by rotation of shaft 44 (see FIG. 2) as a function of a sensed condition from an air core or Bourdon tube-type or other movement generally indicated by the numeral 46 as also shown in FIG. 2. The dial plate 14 of this invention includes a window 22 arcuately therein to follow the indicia 16. Behind the face plate is a rotatable switch set pointer 66.

Figure 3:
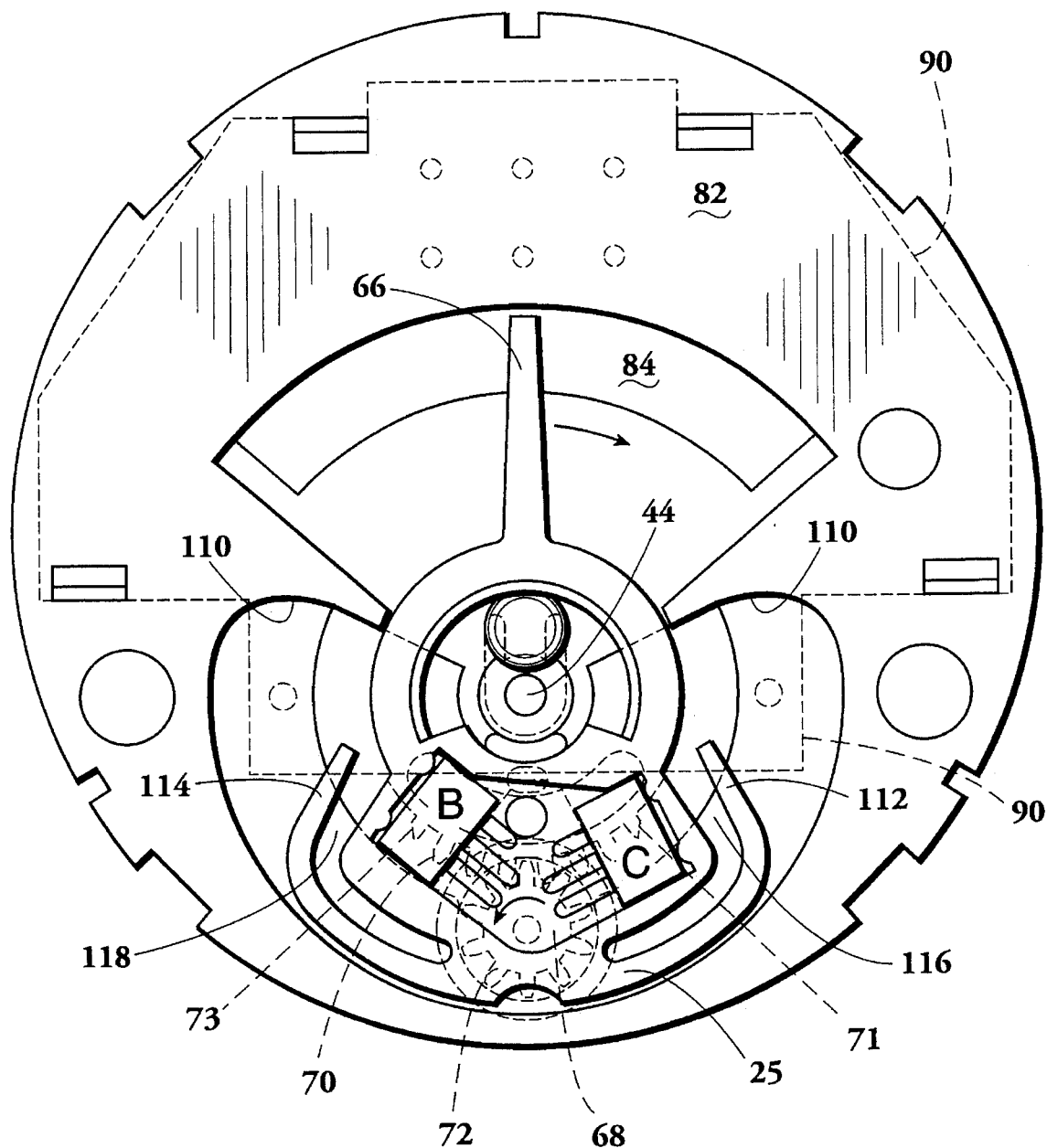
FIG. 3 is a sectional view taken along the line 3—3 of FIG. 2 looking rearwardly from behind the dial plate.

Referring now to FIG. 2, the switch gauge housing 12 includes, rearwardly thereof, appropriate threads 30 which are adapted to allow the housing to be clamped to a dash board or instrument panel 13 using a clamp 15, not shown. Forwardly of the housing is a seal boot 32, formed of a Buna or elastomeric material, which interlocks with the interior of the housing 12. A bezel 34 crimps around the housing and seal boot forming the bevelled face portion 36. The bezel 34 may be of a stainless steel and crimped at its rearward end to retain a dial housing lens 38, typically non-fogging type, and seal boot 32 in compression. The indicating pointer 20 is attached at its hub 40 to the shaft 44 of a meter movement generally designated by the numeral 46. Shaft 44 then becomes the rotational axis for the indicating pointer 20 and the switch set pointer 66. Indicating pointer 20 includes a lower extension 21. The pointer is frictionally retained about hub 40 which is attached to shaft 44. Cap 48, which retains an arcuate magnet 50 is adapted to be snapped onto the indicating pointer to retain the hub 40 and an indicating pointer 20–21 together. An appropriate "snap-on" detent 52 may be provided in the lower extension to retain the assembly. The indicating pointer 20 is made of a translucent or transparent plastic, i.e., Lucite material, and is designed with a angular shoulder 60 in which reflected light from the light source 62, in this instance an LED, reflects the light as shown by the arrowed lines to the rear of the dial plate. The face plate 14 includes a window 22 behind which is located the switch set pointer 66 which is rotatable about the axis formed by the shaft 44. As shown in FIG. 3, a lower extension 25 of the switch set pointer includes means to retain a Hall effect chip or transistor 68. The transistor 68 is connected to the circuit board 90 by electrical conduit, not shown. An arcuate gear rack 70 is formed as a part of the set pointer 66 and is rotated by a smaller pinion gear 72 which is attached to the adjustment arm 74. Adjustment arm 74 extends rearwardly of the housing through O-ring seal 75, being exposed at 76 with a socket or other tool connection means 78 for rotation of the set pointer 66.

Attached to the housing is a truncated or sloping light plate 80 having corrugations 82 at its rearward end wherein light from the LED 62 is transmitted upwardly and refracted by the corrugations as shown by the arrows forwardly to create the back light effect at the window 22. In some instances, a silvered surface or decal 84 is provided behind the window 22 for further visual effect. Attached to and within the housing is a circuit board 90 having appropriate electronic circuitry therein in which electrical connection thereto and therefrom is provided by leads 92 and 94 which sealably extend outside the housing to contacts 96 and 98 respectively. Electrical connection to the LED 62 is provided via contact 100 which interconnects with the computer circuit board 90. A typical wiring diagram is shown in U.S. Pat. Nos. 4,975,687 and 5,121,109.

Referring now to FIG. 3, the light plate 82 is shown with the reflecting decal 84 behind set pointer 66. The light plate includes an opening 110 within which the lower set pointer extension 25 will operate as hereinafter described. The lower portion of the set pointer includes right and left spring-back fingers 112 and 114 respectively which are relatively flexible because of the respective cut-out portions 116 and 118. The set pointer adjustment pinion 72 is shown engaged with larger arcuate radius gear 70 also formed as a part of set pointer and shown dotted in this view.

Figure 4A:
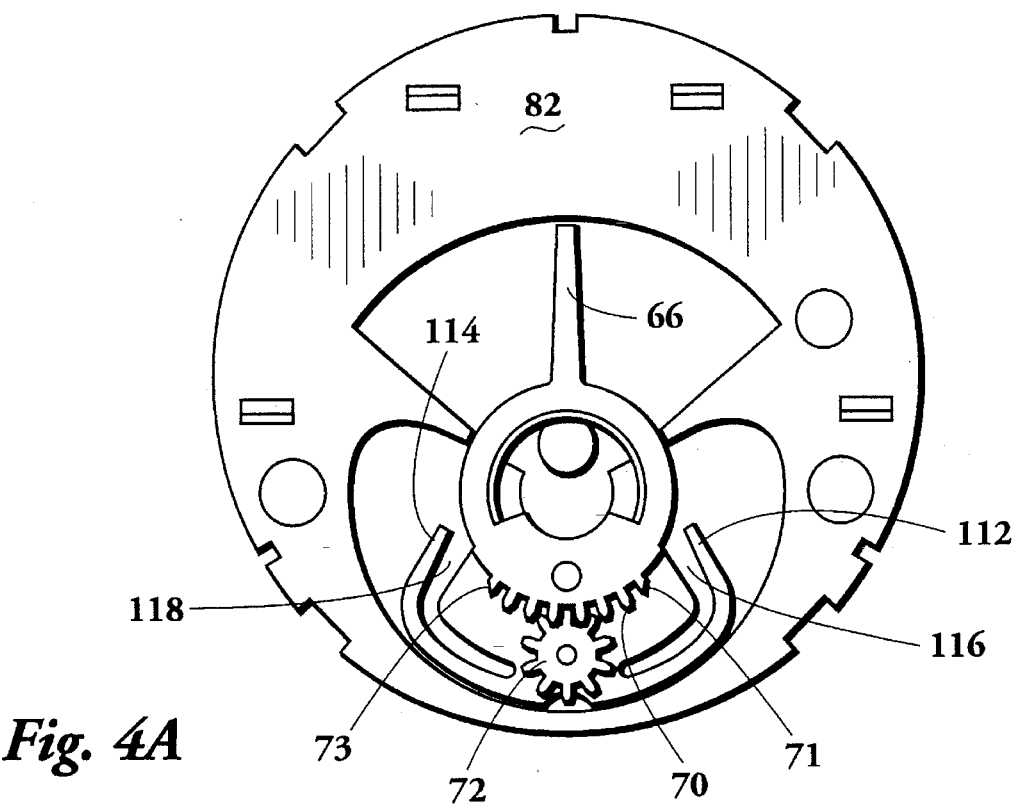
FIGS. 4A, 4B and 4C depict the adjustable set pointer mechanism and the actuation of a slip gear tooth to prevent overriding the movement of the set pointer.
Figure 4B:
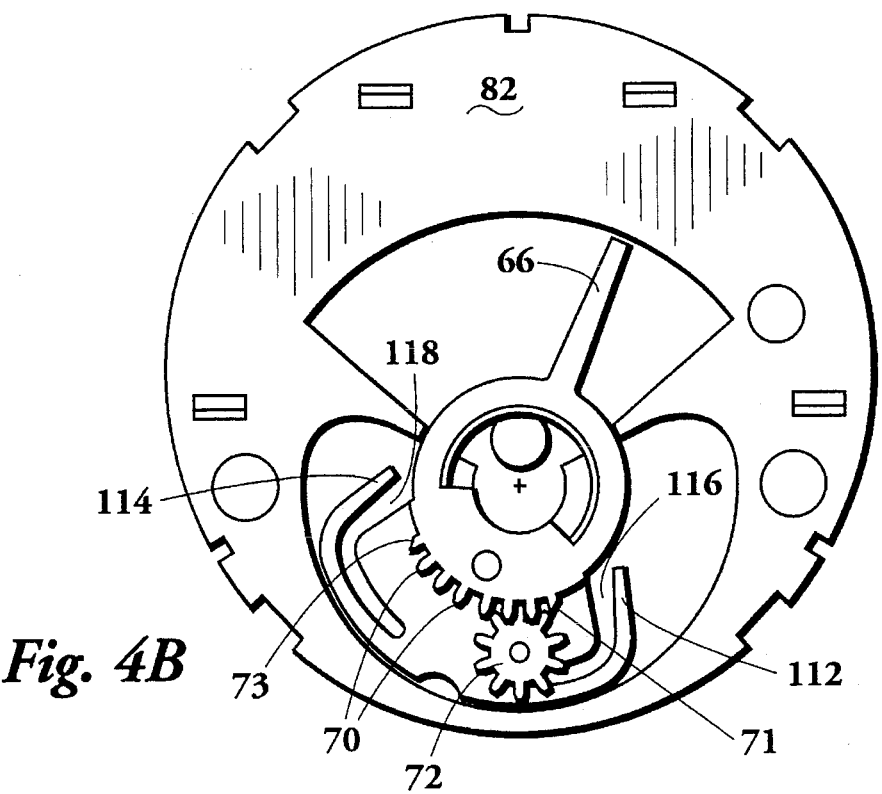
Figure 4C:
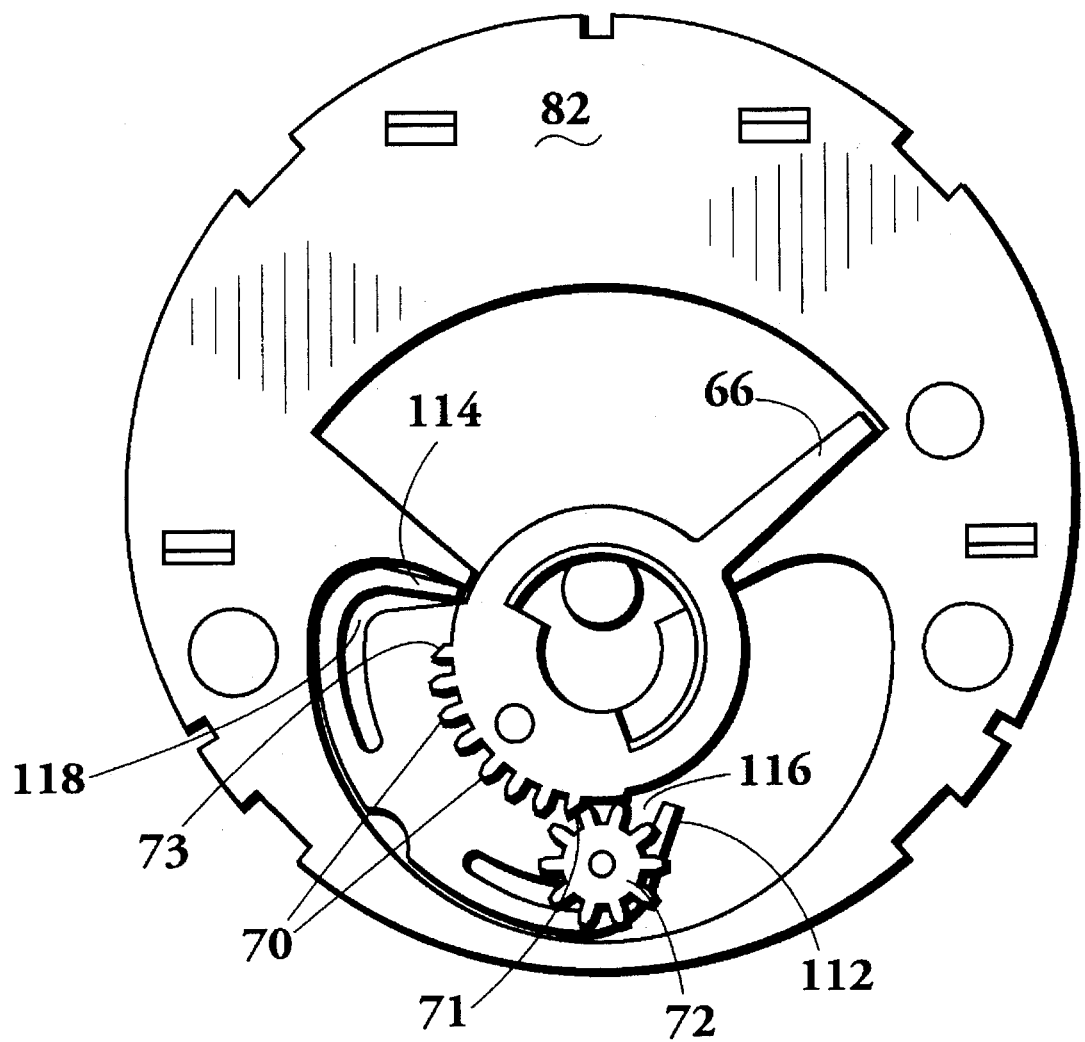

Referring now to FIGS. 4A, 4B and 4C, operation of the overriding slip gear feature of the invention is shown. In FIG. 4A the pinion gear 72 is shown in its initial position relative to the arcuate gear teeth 70 of the set pointer 66. At the end of the larger gear teeth 70 are cut-off gear teeth 71 on the right side and 73 on the left side. Rotation of the smaller pinion gear 72 in the direction shown in 4B will cause the set pointer 66 to move to the right as shown by the arrow in FIG. 3. Upon rotation of the pinion gear 72, the arcuate gear teeth 70 will reach the end where the pinion gear 72 is unable to engage with the cut-off gear tooth 71. This is shown in FIG. 4C where the set pointer 66 has reached its extreme right position. Because of the cut-off gear 71, the pinion gear 72 will no longer cause any further rotative movement when turned in a counter-clockwise direction. At the same time, the spring-back member 114 becomes compressed as the gap 118 is closed on the left side because of the movement of that portion of the set pointer as it abuts against the opening 110 of plate 82. Once the rotative motion of gear 72 is halted, the potential spring force of member 114 will cause the pointer to rotate in a counter clockwise direction and once again engage the gear 72 with the larger radius gears 70 allowing for movement in the reverse direction.

Figure 5:
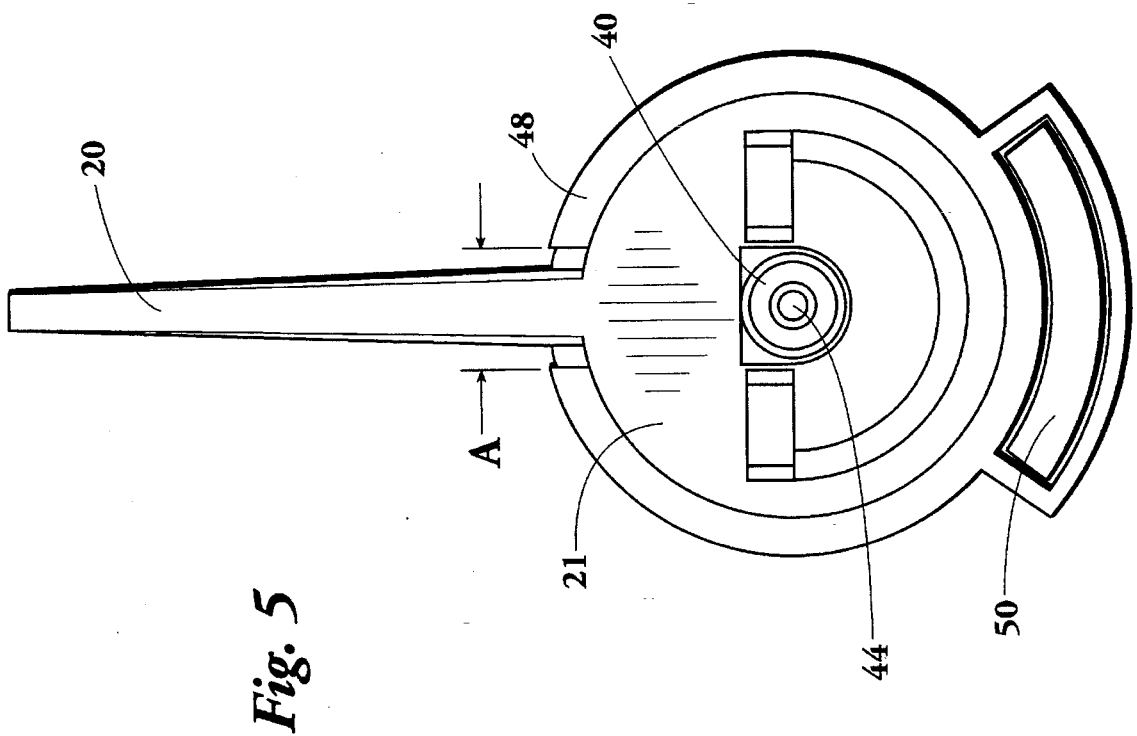
FIG. 5 is a forward view of the indicating pointer taken along the line 5—5 of FIG. 2.

FIG. 5, which is a view looking forward along the line 5—5 of FIG. 2, shows the pointer 20 relative to its hub 40 and cap 48 which retains the actuating magnet 50. In one embodiment cap 48 includes a rearward cylindrical skirt portion having a gap "A" within which the pointer 20 is nested which allows the indicating pointer 20 to be calibrated, as hereinafter described, not only to align the pointer to the dial plate graduations for a particular sensed condition, but also to assure that the magnet 50 will efficiently make the magnetic flux connection to the Hall effect chip or transistor 68. The construction allows the pointer 20, 21 to be rotated about the hub 40 without removing the hub 40 from shaft 44. Further adjustment occurs as cap 48 is also rotatable relative to hub 40. Both the pointer 20, 21 and the cap 48 are frictionally and yet rotatably retained to the hub 40. Slots in the front of hub 40 provide means for a tool to be inserted to hold the hub during rotation of the pointer 20, 21 and/or cap 48.

Figure 6:
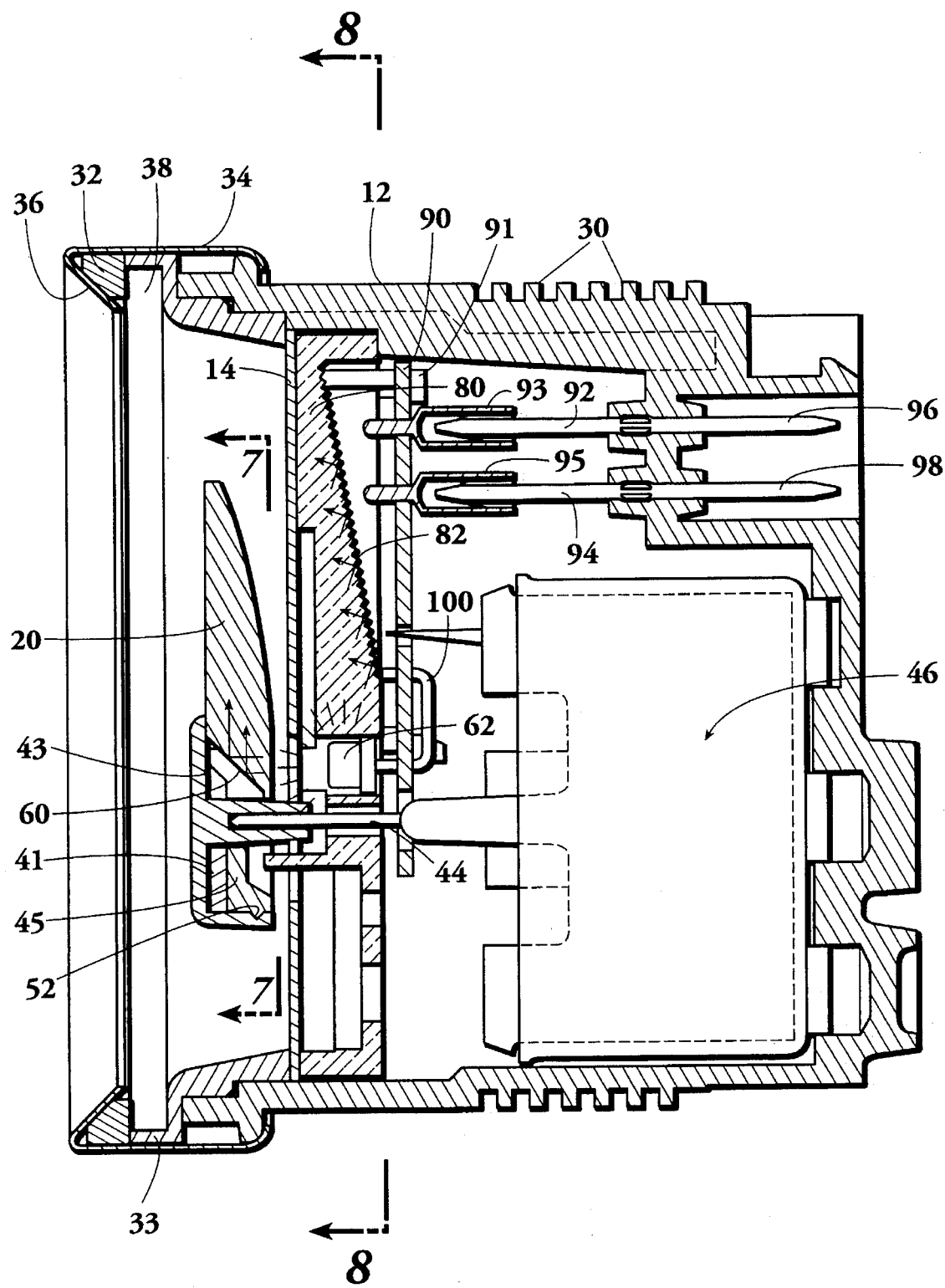
FIG. 6 is a sectional view of an alternate embodiment of the invention of non-magnetic non-switch gauge embodiment, which utilizes essentially the same components of the device described in FIGS. 1–5 inclusive.
Figure 8:
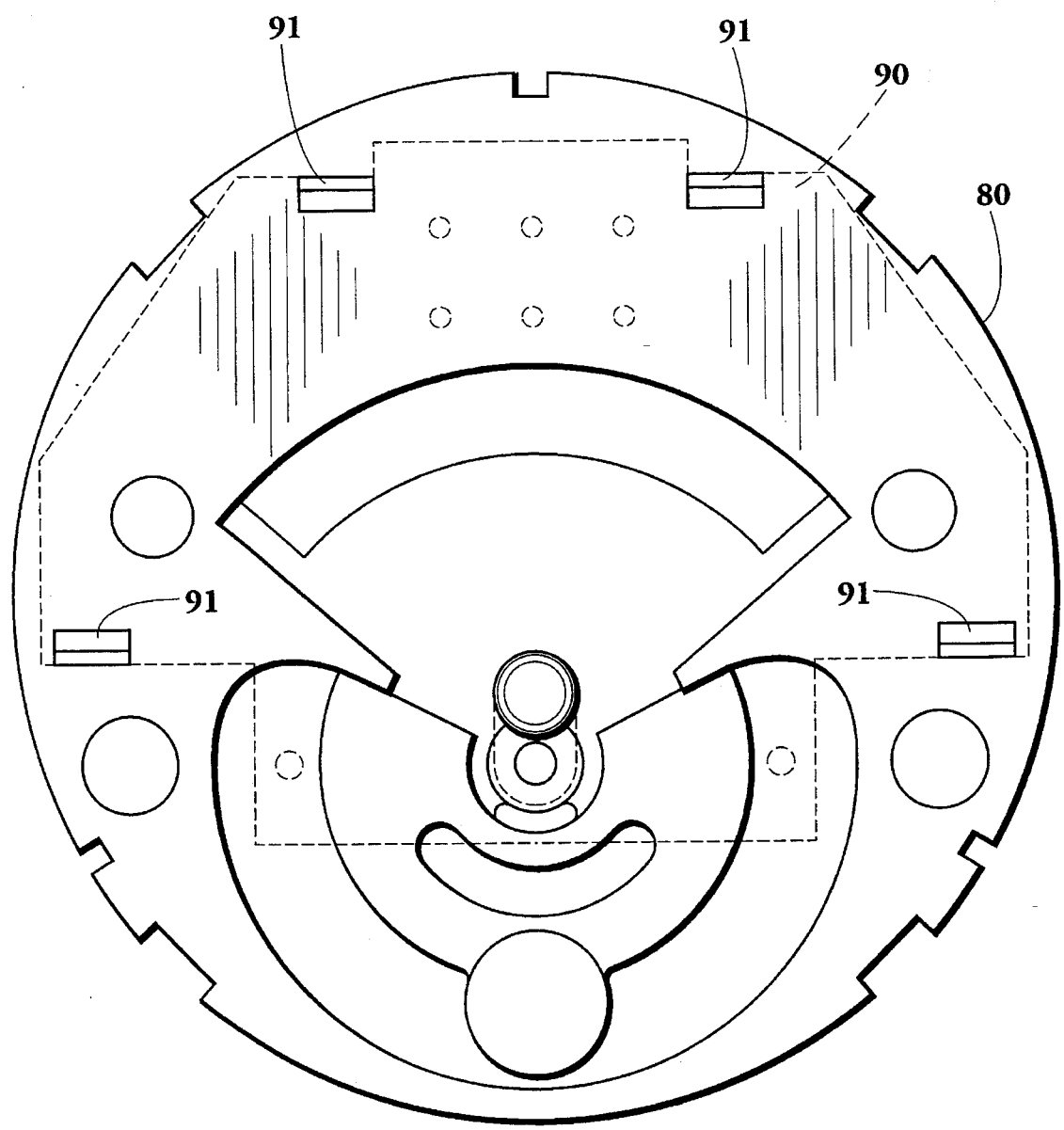
FIG. 8 is a view of the gauge along the line 8—8 of FIG. 6.

FIG. 6 is an alternate embodiment of the invention which does not utilize the set pointer or magnetic actuating switch device. Like parts are shown herein with like numerals from the previous figures. In addition to the absence of the set pointer adjustment concepts found in the previous figures, the concept is very little changed using a majority of like parts to provide a different form of meter or gauge. The indicating pointer 20 includes a lower portion 45 and an integral hub and cap 43 which are assembled together by a protuberance and groove at 52. A counterweight 41 may be included in the assembly. The seal boot may be formed of two pieces 32 and 33 and provides a sealed housing for the gauge. In assembly the retention or light plate 80, the printed circuit board 90 and LED 62 form a sub-assembly held by clips 91 (see FIG. 8). The circuit board has electrical connection sockets or eyelets 93 and 95 to receive respective electrical leads 92 and 94 (which are molded in the housing 12) as the sub-assembly is placed into the housing. Next, the dial plate 14 is positioned against the plate 80 and the pointer sub-assembly attached to the gauge movement shaft 44. Next, seal boot 33, lens 38 and seal boot ring 32 are positioned, and bezel 34 is placed and crimped to compressively and sealably retain the entire assembly.

Figure 7:
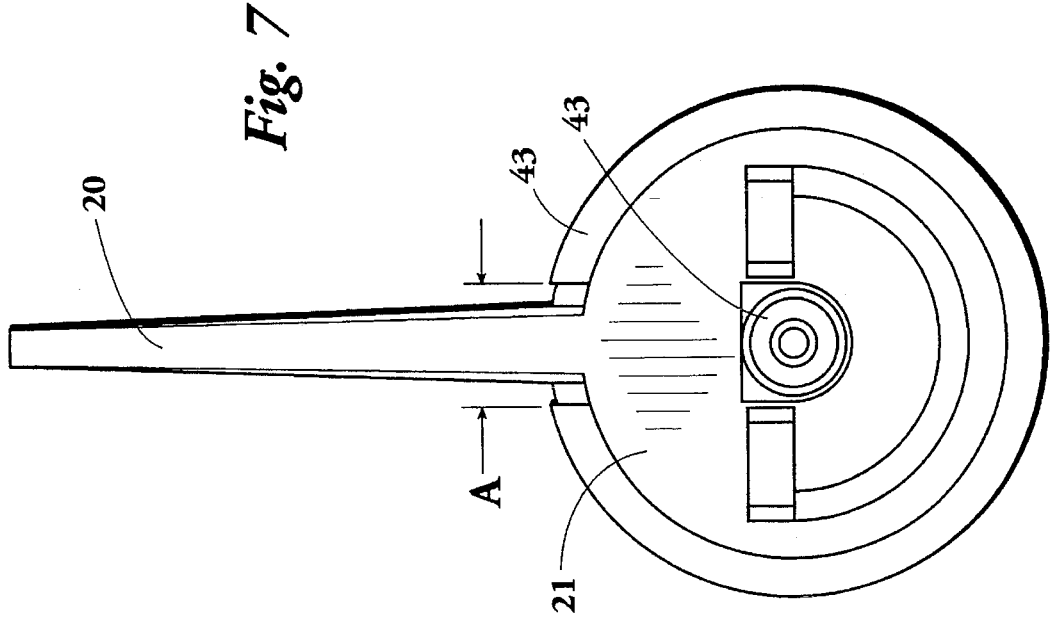
FIG. 7 is a view of the indicating pointer looking forwardly along the line 7—7 of FIG. 6.

Referring to FIG. 7, the indicating pointer 20 includes an integral hub and cap portion 43, again having the calibration adjustment space "A" as described in FIG. 5.

As shown in FIGS. 2 and 5, an important aspect of this invention is the provision of the activating magnet 50 acting as a counterweight for the indicating pointer 20 in addition to its usefulness as a Hall effect switch concept.

In setting up the switch gauge, the first step is to calibrate the pointer by first assembling the pointer 20 hub 40 and cap 48 with the pointer aligned in the center of gap "A" along with the magnet 50 being in desired alignment. The set pointer 66 is then set at a desired reading, e.g., 241 kPa. The gauge is then energized with a corresponding value. The pointer assembly is then placed on the shaft to indicate the sensed reading. Next, there are two parameters to be calibrated: (a) the location of magnet 50 relative to the switch activation Hall chip 68; and (b) the visual location of pointer 20 relative to dial graduations 16.

The magnet 50 is calibrated by rotating the cap/magnet 48/50 in relation to hub 40 so that the Hall switch is activated just as the ascending or descending cap/magnet 48/50 comes to a stop at the energized position which also corresponds to the location of the set pointer 66. For example, if the set pointer 66 is set at 241 kPa and the gauge is energized to correspond to 241 kPa, then the switch should be activated just as cap/magnet 48/50 comes to rest, having previously been at a higher pressure. To calibrate, hub 40 is held by a tool fitting within the forward slots, then rotating cap/magnet 48/50. Pointer 20 may or may not move as the cap 48 is moved; and in fact, cap/magnet 48/50 can rotate 360° relative to hub 40 without changing the location of the pointer 20 within slot "A".

The visual location of pointer 20 is calibrated by moving it relative to hub 40 and the cap/magnet 48/50. The relationship of hub 40 relative to the cap/magnet 48/50 must not change because this is the previous setting for the switch calibration. In this embodiment the adjustment of pointer 20 is limited by the size of gap "A". In other words, the rotational movement of cap/magnet 48/50 relative to pointer 20/21 is limited by gap "A". On the other hand, the rotational movement of pointer 20/21 and cap/magnet 48/50 versus hub 40 is unlimited, e.g., 360°. It is understood that the Hall switch can be made operational in either ascending mode or descending mode of pointer 20. Referring to FIG. 3, if the switch is to operate in an ascending mode, the Hall chip will be place at position "B" on the set pointer; if a descending mode, the chip would be placed at point "C".

In operating the switch gauge of this invention and referring as shown in FIGS. 1–5, the set pointer is adapted to be positioned such that if the indicating pointer 20 should reach approximately 35 psi (241 kPa), the gauge circuitry in the circuit board 90 will, as for example, break a circuit to a power supply to shut down, for example, a pump motor to prevent damaging higher pressures. The set pointer position occurs by the rotation of the adjustment shaft 74 via small spur gear 72 co-acting with the larger radius arcuate gear 70 of the set pointer. The safeguard of this embodiment of the gauge is that the adjustment mechanism is positioned at the rear of the housing such that it will be difficult to be tampered with, unless the instrument is removed from the dashboard or instrument panel. This is highly desirable in certain operations where a preset adjustment of the set pointer is substantially fixed and not to be changed except by authorized personnel. The invention herein is also applicable to switch set pointer adjustment being made at the front of the gauge.

Being an illuminated instrument, the reflected light from the LED 62 is transmitted up the transparent pointer 20 and also provides back light from the light plate 80 into the space formed by window 22. This provides precision readability. The rotational movement of the indicator arm 20 occurs when the magnitude of the sensed condition, i.e., pressure in this case, is translated into rotational movement of the shaft 44 that is connected to the indicating pointer 20. Once the magnet 50 is carried close enough to the Hall effect transistor or chip 68, the switching concept occurs. Various forms of Hall effect switches may be used.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A switch gauge comprising:

a housing supporting a gauge movement responsive to a sensed condition;

a rotatable indicating pointer mounted to a shaft from said gauge movement for indicating said sensed condition, said pointer including a lower extension portion;

a magnet attached to said lower extension portion of said pointer;

a moveable switch set pointer, said set pointer including a lower extended portion;

a non-captivating, magnetically actuated switch element mounted in said lower extended portion of said switch set pointer so as to be within an influence zone of the path of said magnet;

means, outside of said housing, to move said switch set pointer to a desired switch activation set point.

2. The gauge of claim 1 wherein said housing is attached to an instrument panel and said means to move said switch set pointer is located rearwardly of said instrument panel.

3. The gauge of claim 2 wherein said means to move said switch set pointer is located at the rear of said housing.

4. A gauge according to claim 3 wherein said switch element is a Hall effect device.

5. A gauge according to claim 1 including:

a dial plate positioned between said indicating pointer and said moveable switch set pointer, said dial plate having an arcuate window and indicia adjacent said window that are indicative of said sensed condition;

a light refractive means positioned behind said switch set pointer to provide back lighting to said window;

an opening in said dial plate;

means to emit light through said opening onto said indicating pointer and to said light refractive means.

6. A gauge according to claim 5 wherein said means to emit light is an LED.

7. A gauge according to claim 5 wherein said light refractive means includes a light reflective means opposite said window.

8. A gauge according to claim 5 wherein said switch element is a Hall effect device.

9. A gauge according to claim 5 wherein a control circuit board responsive to said switch element is mounted within said housing rearwardly of said light plate with means to connect with an electrical power source outside said housing and with a device to be switched in response to said pointer's being within said influence zone of a preset position of said switch set pointer.

10. A gauge according to claim 1 wherein said switch element is a Hall effect device.

11. A gauge according to claim 1 wherein said means to move said switch set pointer comprises an arcuate gear rack on said lower extended portion of said switch set pointer and a rotatable pinion gear coupled thereto.

12. A gauge according to claim 11 wherein said rotatable pinion gear is attached to a shaft extending rearwardly of said housing with means to rotate said shaft.

13. A gauge according to claim 12 wherein each end of said arcuate gear rack includes a cut-off gear tooth whereby said pinion gear will not engage therewith and therefore limits movement of said switch set pointer at each end of its movement.

14. A gauge according to claim 13 wherein each end of said lower extended portion of said switch set pointer includes spring-back means to restore engagement of said pinion gear and said arcuate gear rack at each respective end of travel of said switch set pointer.

15. The gauge of claim 1 wherein the mounting of said indicating pointer to said shaft comprises:

a hub attached to said shaft, said indicating pointer being rotatably retained to said hub, whereby said indicating pointer can be rotated about said hub without removing said hub.

16. The gauge of claim 15 wherein said hub includes a cylindrical skirt having a gap "A" therein, said indicating pointer being nested within said gap.

17. The gauge of claim 1 wherein the mounting of said indicating pointer to said shaft comprises:

a hub attached to said shaft; and a cap rotatable yet frictionally retained to said hub, said indicating pointer being rotatably retained to said hub and said cap, whereby said indicating pointer can be rotated about said hub without removing said hub.

18. The gauge of claim 17 wherein said cap includes a cylindrical skirt having a gap "A" therein, said indicating pointer being nested therein.

19. A gauge construction comprising the assembly of:

a gauge movement responsive to a sensed condition;

a rotatable pointer mounted upon a shaft from said gauge movement for indicating said sensed condition relative to a forward graduated dial plate;

a retention plate positioned behind said dial plate;

a printed circuit board attached to said retention plate, said board including a plurality of electrical connection sockets;

a housing comprised of a unitary cylindrical cup-shaped rear portion; and a plurality of electrical connectors sealably formed in said housing and oriented for engagement with said electrical connection sockets, said housing being closed and sealed at front by a seal boot, a lens and a bezel compressively retaining said seal boot, said dial plate and said retention plate to said housing.

20. The gauge construction of claim 19 wherein said seal boot is comprised of a rearward member and a forward ring.

21. The gauge construction of claim 19 wherein said retention plate is a light refracting plate and said light refracting plate and said dial plate have a front to rear opening therethrough, a light source positioned in said opening to direct light forwardly through said opening and to provide back light to said dial plate, and means to supply power to said light source from said circuit board.

* * * * *